US006792572B1

(12) United States Patent
Frohlick

(10) Patent No.: US 6,792,572 B1
(45) Date of Patent: Sep. 14, 2004

(54) METHOD AND APPARATUS TO APPROVE DOCUMENTS

(75) Inventor: Eric D. Frohlick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 09/588,792

(22) Filed: Jun. 6, 2000

(51) Int. Cl.[7] ............................................... G06F 17/00
(52) U.S. Cl. ................................... 715/500; 715/501.1
(58) Field of Search ................................ 715/500, 508, 715/511; 700/90; 399/388; 380/2

(56) References Cited

U.S. PATENT DOCUMENTS

| | | | | |
|---|---|---|---|---|
| 5,040,142 A | * | 8/1991 | Mori et al. .................. | 715/511 |
| 5,315,504 A | * | 5/1994 | Lemble ........................ | 700/90 |
| 5,963,641 A | * | 10/1999 | Crandall et al. ................ | 380/2 |
| 6,154,753 A | * | 11/2000 | McFarland .................. | 715/508 |
| 6,529,885 B1 | * | 3/2003 | Johnson ....................... | 399/388 |

* cited by examiner

*Primary Examiner*—Sanjiv Shah
(74) *Attorney, Agent, or Firm*—Blakely, Sokoloff, Taylor & Zafman LLP

(57) ABSTRACT

A method involves identifying at least one target accounts for a document, and identifying which of the at least one target accounts involve a first approval. At least one target accounts for which a first approval is received are identified and removed from the target accounts involving a first approval.

18 Claims, 4 Drawing Sheets

METHOD AND APPARATUS TO APPROVE DOCUMENTS

BACKGROUND

1. Field

The invention relates generally to electronic documents, and more particularly to the review and approval of electronic documents.

2. Background

Modem computer systems are often coupled together into "networks", e.g. groups of computers which may share information with one another. Networked computers may be coupled using various technologies well known in the art, including but not limited to copper lines, fiber optic cables, and wireless technologies such as radio frequency (RF) and infrared. A "computer system", as applied herein, is any device comprising a processor circuit coupled to a memory circuit, the memory circuit capable of storing signals representing operations and data. The operations may be referred to as "software". The processor may access memory and carry out, e.g. "execute", the software to transform or otherwise operate upon the data, in manners well known in the art. A typical computer network may comprise one or more computer systems operating as network "clients", and one or more computer systems operating as network "servers". A "server" computer system may supply, upon request, operations and/or data (resources) to a client computer system. The server typically supplies resources by executing software in response to signal(s) from the client, and by making the resource available to the client by way of the network, in manners well known in the art. Of course, those skilled in the art will appreciate that a particular computer system of a network may operate as either a client, a server, or both, depending upon the circumstances.

Electronic documents may be made available to others by way of a computer network. Electronic documents are collections of electrical signals. For example, an operator of a client may create a document using a word processing program, a spreadsheet program, a presentation program, and many other types of document authoring tools. The document may be made available to others by transferring, via a network, a copy of the document to a server, from which it may be accessed by other clients. Often, documents are stored and made available as electronic files.

Documents may contain sensitive information for which approval may be sought before the document is made available to the target parties. The approval process should allow multiple approvals to originate before the document is made available to the target parties.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

According to an embodiment of the present invention, one or more target accounts are associated with a document. The target accounts represent parties or organizations to which the document is targeted for access. A set of target accounts involving approvals is created. The approvers involved for each target account are identified, and the target accounts for which approvals are received are removed from the set of target accounts involving approval. This process may be repeated for each level or layer of approval involved. Once approvals are received from all approvers involved for a target account, the target account is added to a set of approved target accounts, and the document may be made available to the target accounts. If a disapproval is received at any point, the target accounts for which disapproval is received are removed from the target accounts involving approval and added to a set of disapproved target accounts.

Figure 1:
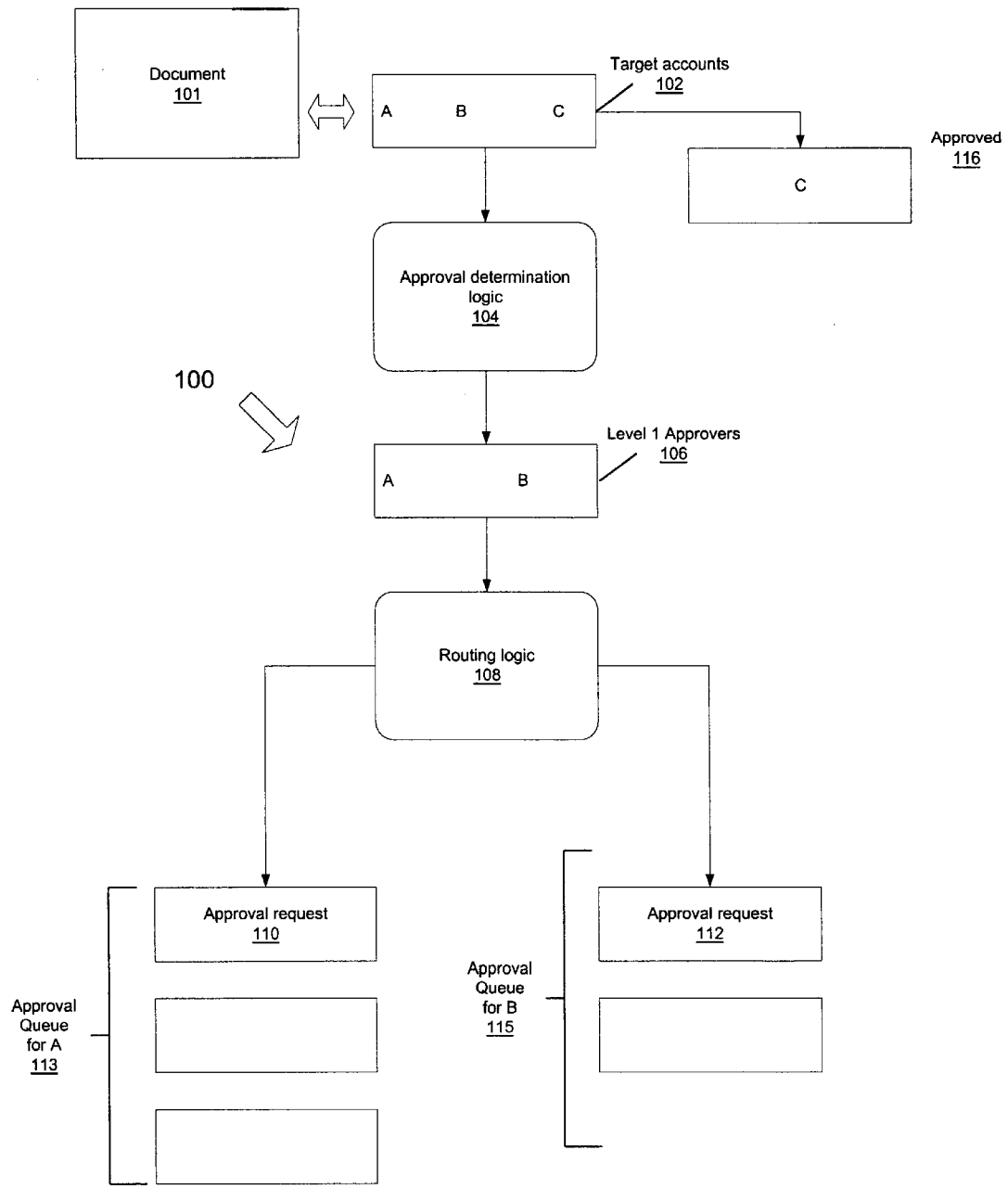
FIG. 1 is a diagram illustrating an embodiment of the present invention.

FIG. 1 is a diagram illustrating an embodiment 100 of the present invention. A document 101 has associated target accounts 102. Target accounts 102 identify individuals, organizations, or other entities to which the document is to be made available. For example, target accounts 102 could identify customers of an organization for whom marketing materials, product, sales, or technical specifications are intended. Each target account may have associated with it data and logic which indicates the extent of approvals before the document may be made available to the target account. For example, some accounts (perhaps highly trusted ones) may not involve any approvals before the document is made available to them. Other accounts may involve approvals from marketing personnel of the organization providing the document. Still others may involve approval by field sales personnel of the organization. Of course the document may involve approvals from multiple parties. For example both marketing and field sales personnel approvals may be involved for a particular account.

Target accounts 102 may be passed to approval determinator 104 which performs processing according to the data and procedures associated with each target account to determine the approvals involved. In embodiment 100 account C is identified as among target accounts 102 to identify in approved accounts 116. In other words, document 101 is approved for access by target account C, which did not involve any approvals to access the document. However, target accounts A and B are identified by approval determinator 104 as involving level 1 approvals and hence identified in accounts involving level 1 approvers 106.

Router 108 dispatches an approval request to each level 1 approver associated with each of accounts 106 involving level 1 approvers. For example, approval request 110 is dispatched to level 1 approval queue 113 for target account A. Approval request 112 is dispatched to level 1 approval queue 115 for target account B.

Figure 2:
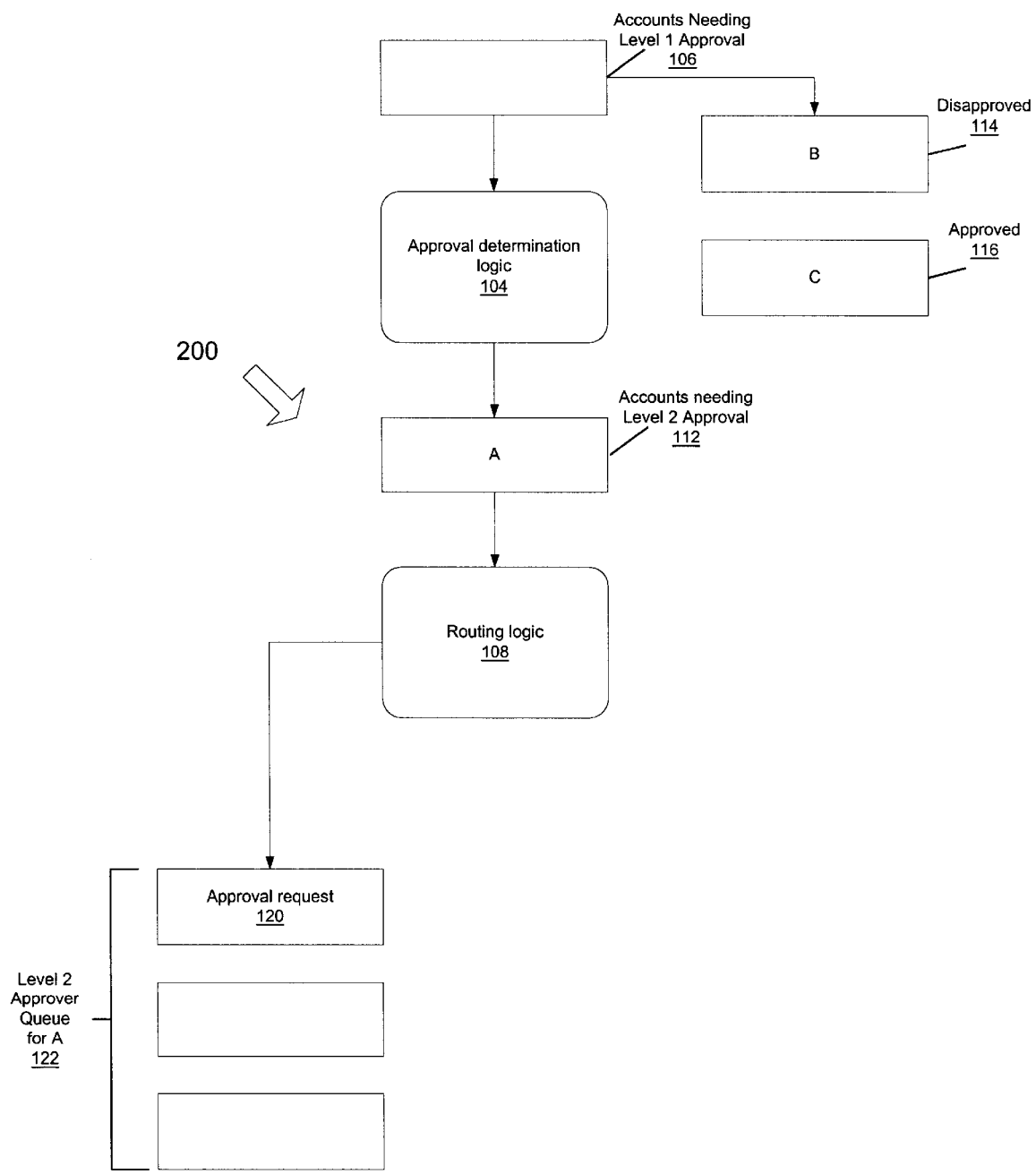
FIG. 2 is a diagram illustrating aspects of an embodiment of the present invention.

FIG. 2 is a diagram illustrating aspects of an embodiment 200 of the present invention. Once approvals are received from each level 1 approver involved for a target account, the identification of the account may be removed from 106 which identifies accounts involving level 1 approval. Also, if disapproval by a level 1 approver is received, the disproved target account identification may be removed from 106. For example, identification of target account A is removed from 106 once level 1 approvals are received, and identification of account B is removed from 106 and identified in 114 which identifies disapproved target accounts. Account B, identified as disapproved, may thus not be permitted to access document 101.

Account identifications remaining in 102 may be again submitted to approval determinator 104 to determine if additional approvals are involved. In embodiment 200, identification of target account A is placed in 112 which identifies accounts involving level 2 approval. Router 108 dispatches an approval request to each level 2 approver involved in approving each target account identified in 112. For example, approval request 120 may be dispatched to level 2 approver queue 122 for target account A.

Figure 3:
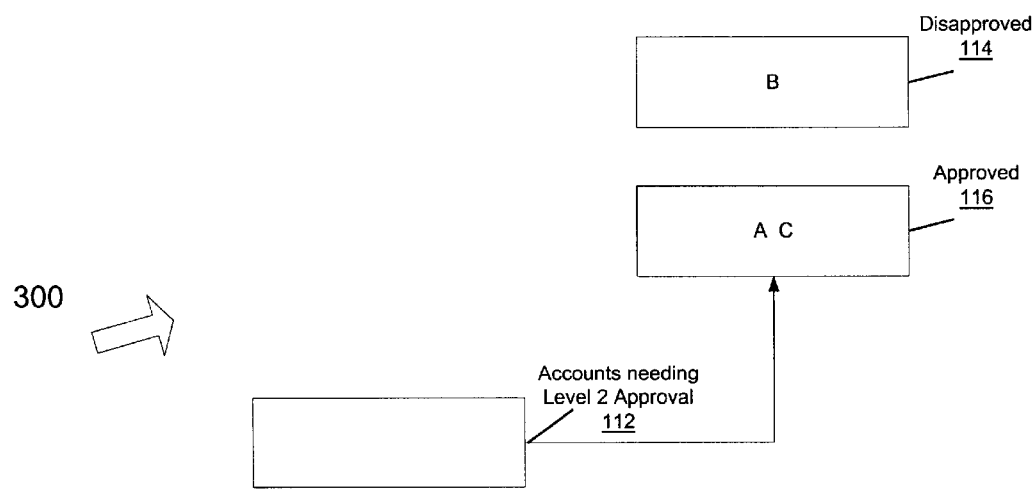
FIG. 3 illustrates aspects of an embodiment of the present invention.

FIG. 3 illustrates aspects of an embodiment 300 of the present invention. An approval is received from each level 2 approver involved in the approval of target account A. Identification of target account A is therefore removed from 112 and an identification of target account A is made in approved 116 which identifies target accounts approved to access document 101. Document 101 may now be accessed by target accounts A and C but not by target account B which has been disapproved for access. Of course, fewer or additional approvals could be involved for a particular target account. When additional approvals are involved further processing may be carried out in accordance with the manners previously described.

A document and associated target accounts may be submitted to a web server. Typically, the author of the document will perform the submission. The web server may transmit the document to a document server to be stored, and the document may be reside on and be accessed from the document server throughout the approval process. An account database (possibly residing on a separate account server) may be accessed to identify which approvers are involved for the target accounts associated with the document. Approval requests may be communicated to these approvers, possibly via email. The approvers may request access the document by way of the web server, and the web server may communicate with the document server to provide access to the document stored there. The approvers may review the document and submit approvals to the web server. The document may be made available to the target accounts when approvals are received from all approvers.

Figure 4:
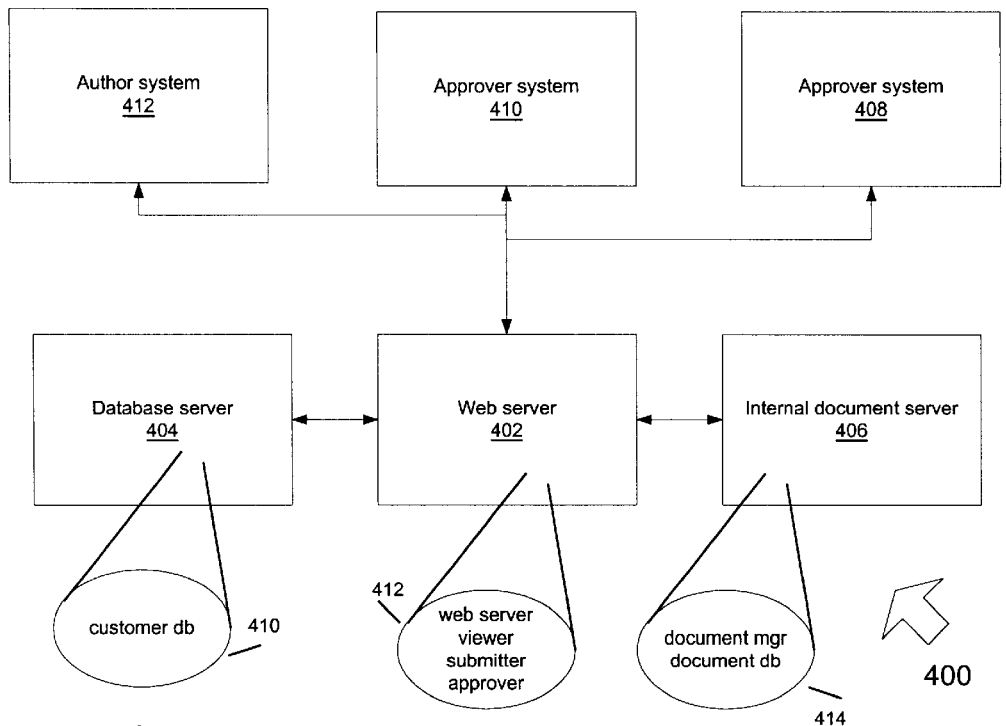
FIG. 4 shows an embodiment of a computer network in accordance with the present invention.

FIG. 4 shows an embodiment 400 of a computer network in accordance with the present invention. Embodiment 400 comprises a web server 402 communicatively coupled with a database server 404 and an internal document server 406. Web server 402 comprises web server functionality, viewer functionality, submitter functionality, and approver functionality, which of course may be implemented in software, hardware, or a combination thereof. Internal document server 406 comprises document manager functionality and document database functionality. Database server 404 comprises account database functionality. An authoring system 412 and two approver systems 410 and 418 are also communicatively coupled with web server 402.

Web server functionality of web server 402 may operate to provide protocol interfaces such as the hypertext transport protocol (HTTP), file transfer protocol (FTP) and others for providing access to web pages, files, and so on. Submitter functionality of web server 402 may operate to enable the submission of documents to web server 402. For example, the document may be created using author system 412 using a word processor, spreadsheet, presentation program, and any other document authoring tool. The document may be transmitted from author system 412 to web server 402 and submitter may operate to accept the transmitted document at web server 402. Submitter may then further operate to transmit the submitted document to internal document server 406. The document manager of document server 406 may operate to accept the transmitted document and store it in cooperation with the document database.

To facilitate the approval process of a document, viewer functionality of web server 402 may operate to make available to approver systems, such as 410 and 408, a document stored by internal document server 406. Viewer may operate in cooperation with the document manager and the document database of document server 406 to make a document stored by internal document server 406 available to an approver system for review and approval. Once a document has been reviewed by an approver, approvals or denial of approvals may be received using approver functionality of web server 402. Approver functionality may operate in cooperation with the document manager and the document database of document server 406 to facilitate the approval process for the document, for example as described in conjunction with FIGS. 1–3. Approver functionality may further operate in cooperation with the account database of database server 404 to determine which approvers are involved for a particular target account associated with the document.

Figure 5:
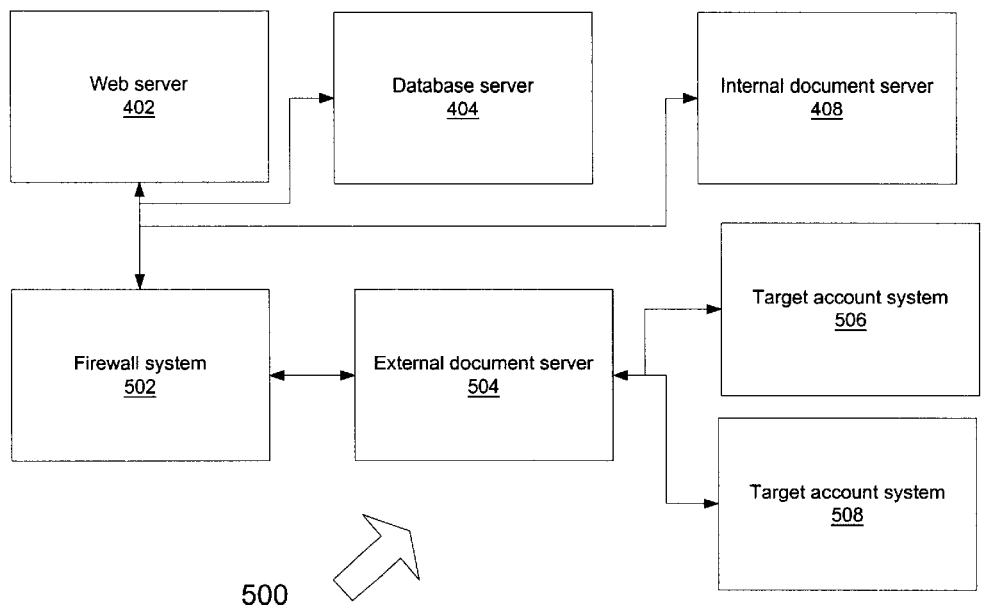
FIG. 5 shows an embodiment of a computer network in accordance with the present invention.

FIG. 5 shows an embodiment 500 of a computer network in accordance with the present invention. Web server 402, database server 404, and internal document server 408 are communicatively coupled with firewall system 502. When all approvals involved for a document are received, the document may be transmitted from internal document server 408 via firewall system 502 to external document system 504. Firewall system 502 provides protection of web server 402, database server 404, internal document server 408 from computer systems not authorized to communicate directly with those servers. For example, web server 402, database server 404, and internal document server 408 may be accessible only by employees or other members of a company or other organization, whereas external document server 504 may be accessible by customers, suppliers and others who do business with the organization. Once the document is transmitted to external document server 504, it may be accessed by the accounts to which it was targeted. Target account systems 506 and 508 are communicatively coupled with external document server 504 to access documents which external document server 504 may store or otherwise control access to.

One or more of the computer systems comprised by network 500 may comprise a machine-readable medium storing instructions which, when executed by one or more processors of the computer systems, result in the practice of the present invention. For example the executed instructions may result in identifying at least one target accounts for a document and identifying which of the at least one target accounts involve a first approval. The at least one target accounts for which a first approval is received may be identified and removed from the target accounts involving a first approval.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

identifying at least one target accounts for a document;

identifying which of the at least one target accounts involve a first approval; and identifying the at least one target accounts for which a first approval is received and removing the at least one target accounts for which a first approval is received from the target accounts involving a first approval.

2. The method of claim 1 further comprising:

identifying the at least one target accounts for which a disapproval is received and removing the at least one target accounts for which a disapproval is received from the target accounts involving a first approval.

3. The method of claim 1 further comprising:

identifying which of the at least one target accounts involve a second approval; and identifying the at least one target accounts for which a second approval is received and removing the at least one target accounts for which a second approval is received from the at least one target accounts involving a second approval.

4. The method of claim 1 further comprising:

identifying the at least one target accounts for which no approvals are involved and removing the at least one target accounts for which no approvals are involved from the target accounts involving a first approval.

5. The method of claim 3 further comprising:

identifying at least one target accounts for which all involved first and second approvals are received.

6. A method comprising:

submitting a document and a set of at least one associated target accounts to a web server;

the web server transmitting the document to a document server to be stored;

identifying which approvers are involved for the at least one target accounts;

communicating approval requests to the identified approvers, the web server receiving approvals from the identified approvers; and the document made available to the at least one target accounts when all approvals are received from the identified approvers.

7. The method of claim 6 further comprising:

the at least one identified approvers requesting to access the document by way of the web server; and the web server communicating with the document manager to provide the at least one approvers with access to the document.

8. The method of claim 6 in which communicating approval requests to the identified at least one approvers is accomplished using email.

9. An article comprising:

a machine-readable medium having stored thereon instructions which, when executed by a processor, result in:

identifying at least one target accounts for a document;

identifying which of the at least one target accounts involve a first approval; and identifying the at least one target accounts for which a first approval is received and removing the at least one target accounts for which a first approval is received from the target accounts involving a first approval.

10. The article of claim 9 in which the instructions, when executed by the processor, further result in:

identifying the at least one target accounts for which a disapproval is received and removing the at least one target accounts for which a disapproval is received from the target accounts involving a first approval.

11. The article of claim 9 in which the instructions, when executed by the processor, further result in:

identifying which of the at least one target accounts involve a second approval; and identifying the at least one target accounts for which a second approval is received and removing the at least one target accounts for which a second approval is received from the at least one target accounts involving a second approval.

12. The article of claim 9 in which the instructions, when executed by the processor, further result in:

identifying the at least one target accounts for which no approvals are involved and removing the at least one target accounts for which no approvals are involved from the target accounts involving a first approval.

13. The article of claim 12 in which the instructions, when executed by the processor, further result in:

identifying at least one target accounts for which all involved first and second approvals are received.

14. An apparatus comprising:

a processor; and a machine-readable medium having stored thereon instructions which, when executed by the processor, result in:

identifying at least one target accounts for a document;

identifying which of the at least one target accounts involve a first approval; and identifying the at least one target accounts for which a first approval is received and removing the at least one target accounts for which a first approval is received from the target accounts involving a first approval.

15. The apparatus of claim 14 in which the instructions, when executed by the processor, further result in:

identifying the at least one target accounts for which a disapproval is received and removing the at least one target accounts for which a disapproval is received from the target accounts involving a first approval.

16. The apparatus of claim 14 in which the instructions, when executed by the processor, further result in:

identifying which of the at least one target accounts involve a second approval; and identifying the at least one target accounts for which a second approval is received and removing the at least one target accounts for which a second approval is received from the at least one target accounts involving a second approval.

17. The apparatus of claim 14 in which the instructions, when executed by the processor, further result in:

identifying the at least one target accounts for which no approvals are involved and removing the at least one target accounts for which no approvals are involved from the target accounts involving a first approval.

18. The apparatus of claim 17 in which the instructions, when executed by the processor, further result in:

identifying at least one target accounts for which all involved first and second approvals are received.

* * * * *